United States Patent [19]

Tasker et al.

[11] Patent Number: 4,863,884
[45] Date of Patent: Sep. 5, 1989

[54] METHOD FOR REJUVENATING USED CATALYSTS

[75] Inventors: Kenneth G. Tasker, Yardley, Pa.; John D. Milligan, Little Silver, N.J.

[73] Assignee: HRI, Inc., Lawrenceville, N.J.

[21] Appl. No.: 199,872

[22] Filed: May 25, 1988

Related U.S. Application Data

[62] Division of Ser. No. 36,767, Apr. 9, 1986, Pat. No. 4,769,219.

[51] Int. Cl.$^4$ .................. B01J 38/60; B01J 38/56
[52] U.S. Cl. .................. 502/27; 208/52 CT; 502/31; 502/516
[58] Field of Search .......... 502/22, 27, 28, 29, 502/30, 31, 32, 33, 516; 208/52 CT

[56] References Cited

U.S. PATENT DOCUMENTS

| | | | |
|---|---|---|---|
| 2,904,518 | 9/1959 | Shea | 502/22 |
| 3,541,002 | 11/1970 | Rapp | 502/30 |
| 3,627,705 | 12/1971 | Kingsbury | 422/223 |
| 3,772,211 | 11/1973 | Mounce | 502/22 |
| 3,839,191 | 10/1974 | Johnson | 502/22 |
| 3,843,330 | 10/1974 | Conner et al. | 208/164 |
| 4,454,240 | 6/1984 | Ganguli | 502/27 |

FOREIGN PATENT DOCUMENTS 0034853  9/1981  European Pat. Off. ............ 502/516

Primary Examiner—Paul E. Konopka
Attorney, Agent, or Firm—Fred A. Wilson

[57] ABSTRACT

Method for treating particulate used oil-coated catalysts to provide a rejuvenated catalyst material in a rejuvention vessel assembly. The pressurizable vertically-oriented vessel assembly has inlet and outlet openings for the catalyst and washing fluids, and has a removable lower sub-assembly head portion which contains a conical shaped grid unit located therein. The vessel assembly is arranged to permit solvent washing, vacuum drying and acid treatment and gas drying of the used catalyst in a bed supported above the conical grid, by upward flow and recycle of the washing liquids and fluidization of the catalyst. Following rejuvenation of the catalyst, it is withdrawn from the vessel downwardly through the conical shaped grid and out through a central withdrawal conduit containing a slide valve unit for further processing or use as desired.

6 Claims, 4 Drawing Sheets

METHOD FOR REJUVENATING USED CATALYSTS

This is a division of application Ser. No. 07/036,767, filed Apr. 9, 1986, now U.S. Pat. No. 4,769,219.

BACKGROUND OF THE INVENTION

This invention pertains to a catalyst rejuvenation vessel assembly and a method for rejuvenation treatment of particulate used catalysts. It pertains particularly to such a rejuvenation vessel assembly and method for used catalyst rejuvenation in which solvent washing, acid-treatment, water washing, and drying steps for used catalysts are all performed successively in the single vessel, followed by withdrawal of the rejuvenated catalyst from the vessel.

Regeneration of used particulate catalysts from hydrocarbon catalytic processing operations to remove carbon and metal compounds deposits from the catalyst is known and usually uses multiple vessels for accomplishing the catalyst treatment. For example, U.S. Pat. No. 4,287,088 to Sirkar discloses a concentric vessel arrangement for used catalyst treatment by flotation and segregation of the particles. Also, U.S. Pat. No. 4,454,240 to Ganguli discloses process steps for acid treatment of used catalyst to remove metals compounds deposited thereon which uses several different vessels sequentially. Although such equipment and processes have been found useful for regeneration of used catalysts, it would be desirable to provide an improved single vessel unit arranged for advantageously performing any or all the catalyst washing, treating and drying functions successively in the same vessel. However, such a catalyst rejuvenation vessel arrangement has evidently not previously been developed suitable for commercial use.

SUMMARY OF INVENTION

The present invention provides a multi-function presurizable vessel assembly adapted for rejuvenating particulate used catalysts retained in a fluidized bed in the vessel. The invention also provides a catalyst rejuvenation method which utilizes the vessel assembly. The catalyst rejuvenation vessel assembly is vertically-oriented and in its lower portion contains a conical-shaped grid unit arranged to retain and support a particulate catalyst bed, so as to provide for upward flow of a solvent washing liquid, an acid for catalyst treatment and, drying gas through the bed of particulate catalyst in the vessel. The vessel has an upper opening means provided at its upper end for introducing the particulate used catalyst into the catalyst bed, and has a lower opening at its bottom end for withdrawing the rejuvenated catalyst. The conical grid plate unit provided in the vessel lower portion has a downwardly extending conduit containing a gate valve unit arranged for catalyst withdrawal from the vessel. The grid plate and gate valve units each contain screen elements which support the catalyst bed and also permit the upward flow of the liquid and gas through the catalyst bed.

The vessel lower portion containing the conical grid unit and withdrawal conduit and gate valve is a sub-assembly removably attached to the vessel upper portion by means of a bolted circumferential flange joint. The vessel lower sub-assembly has a lower connection for introducing the liquid and gas flows upwardly to the catalyst bed, and has an upper connection near the vessel upper end for fluid withdrawal therefrom. The conical grid and valve gate unit each utilize screen elements having multiple openings each shaped with a downwardly expanding taper, so as to support the catalyst bed and also avoid the screen openings being plugged by catalyst particles becoming lodged therein. The screen openings can have various shapes such as circular or elongated, and preferably have elongated or slotted type openings. Following the catalyst rejuvenation steps including solvent washing, solvent removal, acid treatment and water washing of the catalyst followed by hot gas drying, the rejuvenated catalyst is withdrawn downwardly through the conical-shaped grid plate unit and withdrawal conduit containing the special gate valve unit and removed from the vessel.

The method of the present invention for rejuvenating used inactivated catalyst removed from hydrocarbon processing operations includes first introducing a particulate used catalyst material containing a heavy hydrocarbon oil and carbon coating and metals compound deposits, into the rejuvenation vessel assembly to form a catalyst bed above the conical grid plate therein. The next steps include flowing a suitable hydrocarbon solvent liquid upwardly through the catalyst bed to fluidize the catalyst and substantially remove the heavy oil coating from the catalyst, and then draining and evaporating the solvent liquid from the catalyst preferably at sub-atmospheric pressure to provide a substantially oil-free catalyst material. Next, a dilute acid solution is flowed upwardly through the oil-free catalyst bed to fluidize the catalyst and dissolve and remove metal compounds deposits from the catalyst, then the acid-treated catalyst is water washed to remove the acid, followed by flowing a heated gas upwardly through the catalyst bed to dry the catalyst. The rejuvenated particulate catalyst is then withdrawn from the lower end opening of the rejuvenation vessel assembly.

The present invention advantageously provides an improved vessel assembly and method for convenient and effective rejuvenation of particulate used catalysts by solvent washing to remove heavy contaminating oils, acid treatment to dissolve the metal compounds deposited on the catalyst during use, and washing and drying steps needed to rejuvenate the catalyst in a single vessel assembly. The vessel assembly and method thus minimizes undesired catalyst attrition and expense resulting from the usual repeated handling of the catalyst material in separate vessels during rejuvenation steps.

BRIEF DESCRIPTION OF DRAWINGS

The invention will be further described by reference to the following drawings, in which.

DESCRIPTION OF INVENTION

Figure 1:
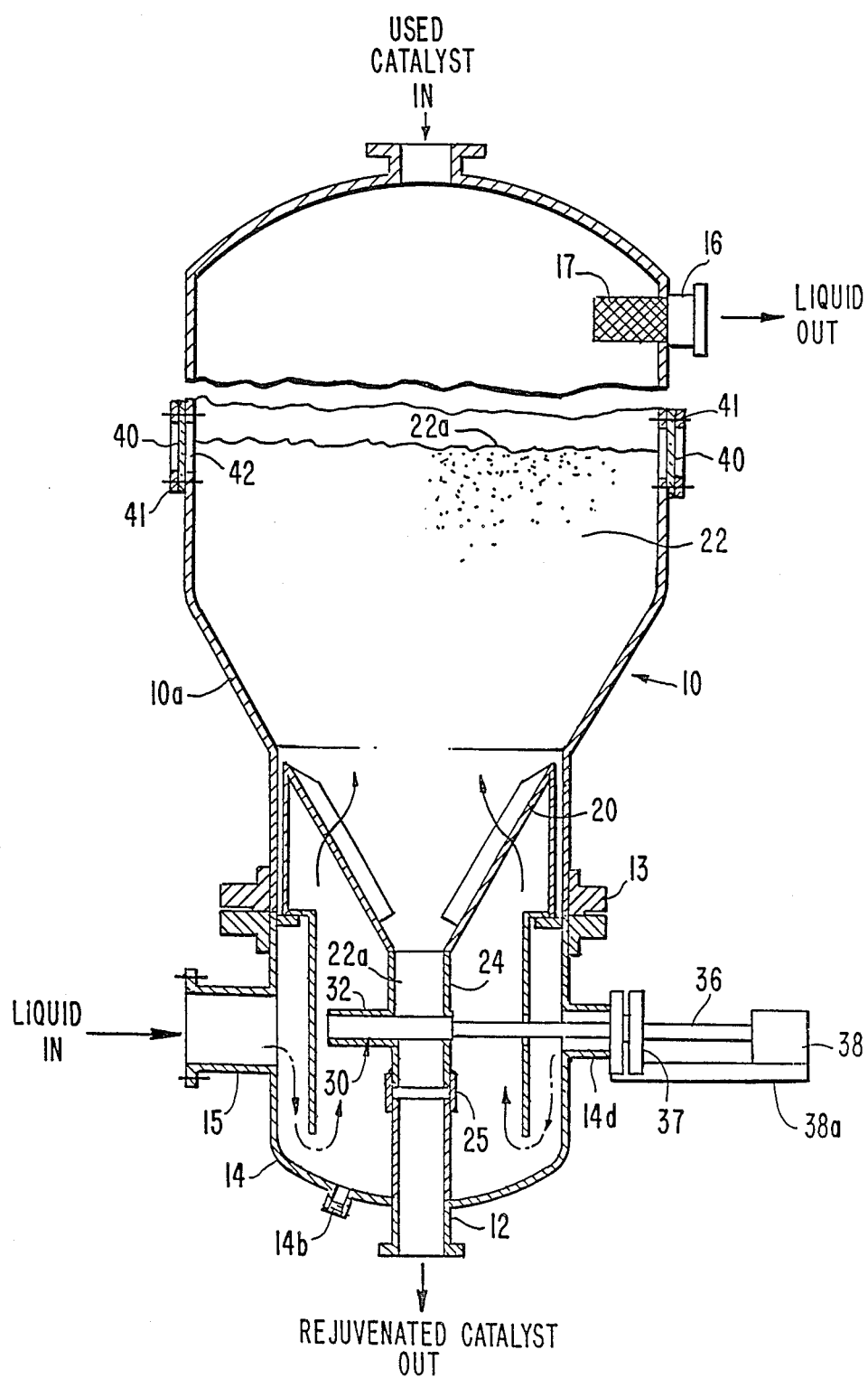
FIG. 1 shows a cross-sectional elevation view of a catalyst rejuvenation vessel assembly constructed according to the present invention.

According to a preferred embodiment of the invention as shown by the FIG. 1 drawing, the catalyst rejuvenation vessel assembly 10 is a cylindrical, pressurizable vertically-oriented vessel provided with an upper central opening 11 at its upper end for introducing a particulate used catalyst into the vessel for treatment, and has a lower opening 12 at the vessel bottom end for withdrawal of rejuvenated catalyst. The vessel 10 includes lower end sub-assembly 14 which is removably connected to the vessel 10 at bolted flange 13 as required for internal inspection and servicing operations. The vessel 10 preferably has a reduced diameter in its lower portion, as provided by a central tapered portion 10a of the vessel wall. Also, the vessel 10 has a lower connection 15 provided on the side of lower end sub-assembly 14 for introducing a fluidizing liquid into the vessel, and has an upper fluid connection 16 provided in the vessel side wall above a catalyst bed 22 for liquid withdrawal from the vessel 10. The upper outlet conection 16 has a screen 17 arranged to prevent catalyst particles in bed 22 from exiting the vessel with the recirculated liquid flow. The vessel 10 is constructed suitable for withstanding a maximum temperature of 250° F. and 100 psig pressure, and is made of a material which is corrosion resistant to acids, such as being clad with a corrosion proof material, for example Hastelloy.

Figure 2:
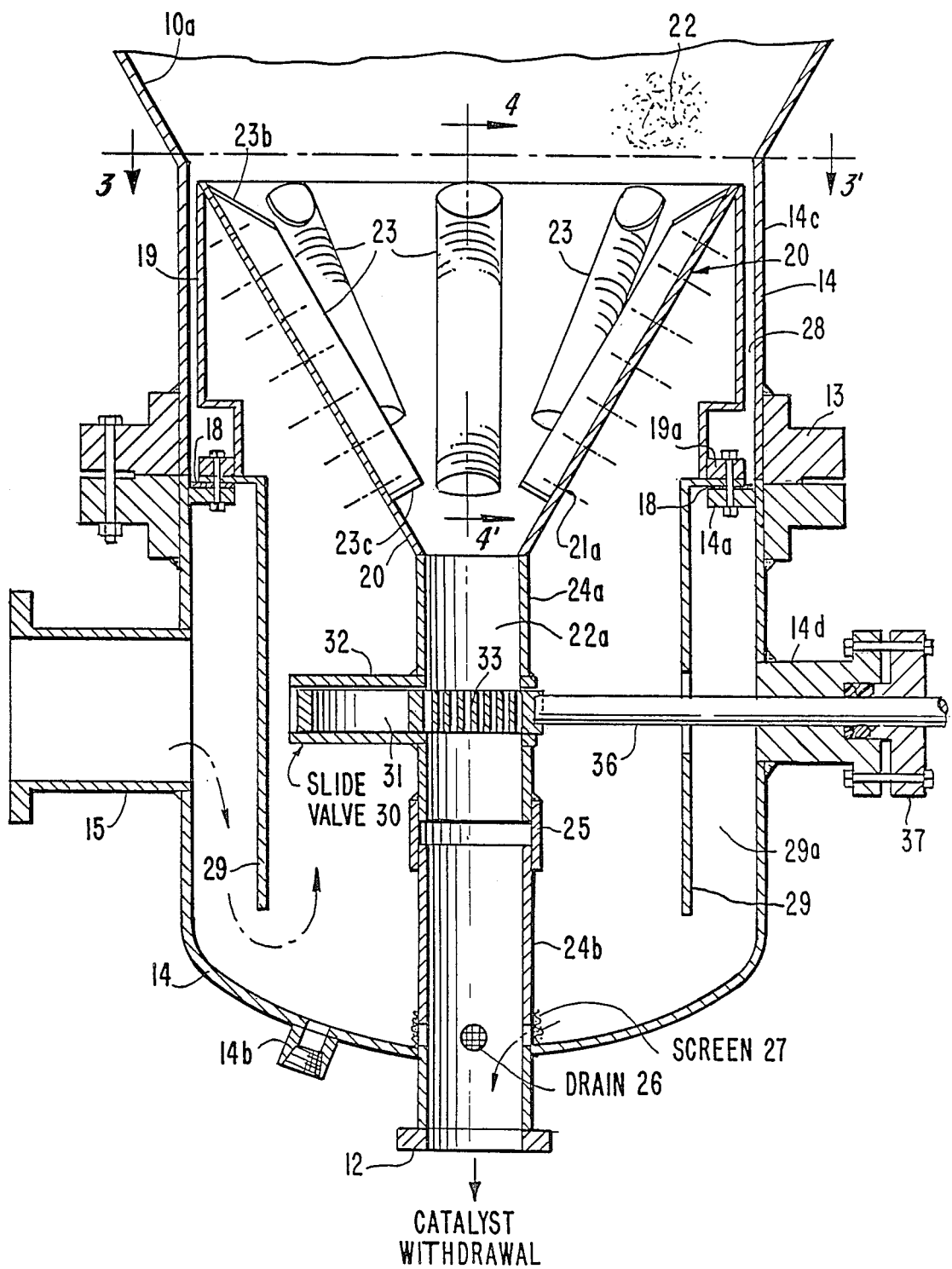
FIG. 2 shows an enlarged cross-sectional elevation view of the lower portion sub-assembly of the rejuvenation vessel, including a conical grid plate unit for catalyst bed support and a withdrawal conduit and slide gate valve unit.
Figure 3:
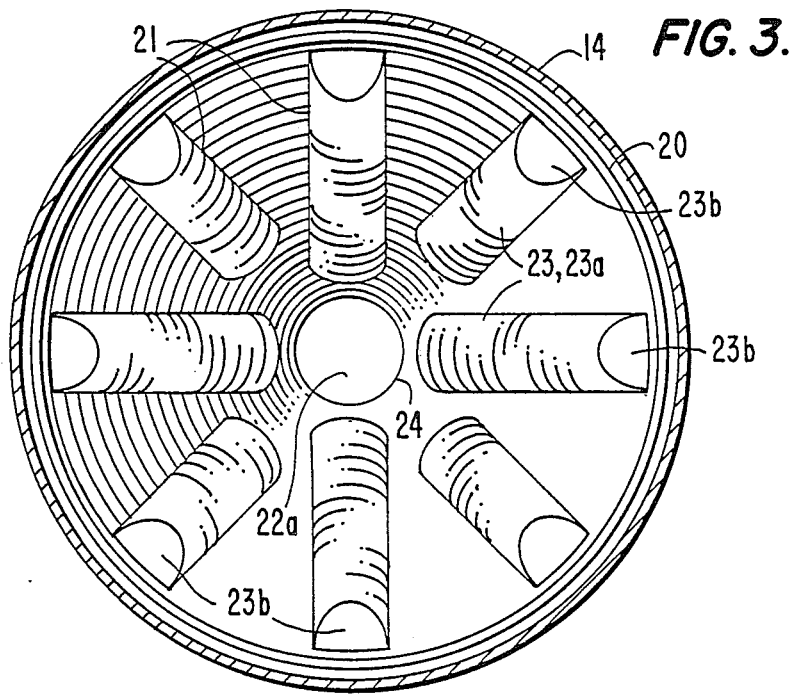
FIG. 3 shows a plan view of the conical grid unit used in the rejuvenation vessel, taken at line 3—3' of FIG. 2.

As best shown in FIGS. 2 and 3, a conical shaped grid plate unit 20 is provided in the vessel lower portion to support the bed 22 of particulate catalyst being rejuvenated by upward flow of the solvent washing and acid treatment liquids through the grid and catalyst bed. Grid unit 20 is supported at its circumference by a cylindrical skirt 19 attached to a flange 19a, which flange is bolted onto inner flange 14a of the sub-assembly 14. To prevent undesired drainage of catalyst particles downwardly through the conical grid 20, multiple radial openings 21 are provided in the grid plate and each opening is covered by a parallel slotted type Johnson screen material 23 having multiple parallel openings 23a provided therein oriented transverse to the radial openings 21. The multiple parallel slotted openings 23a are tapered so as to be wider at the slot lower portion and thereby avoid plugging the screen due to fine catalyst particles from the bed 22 becoming wedged therein. The width of slotted openings 23a at their upper narrowest end is selected to be slightly narrower than the catalyst particle diameter and will depend on the catalyst particle size being treated, which can be 0.03 to 0.125 inch and will usually be 0.040 to 0.060 inch wide.

Figure 4:
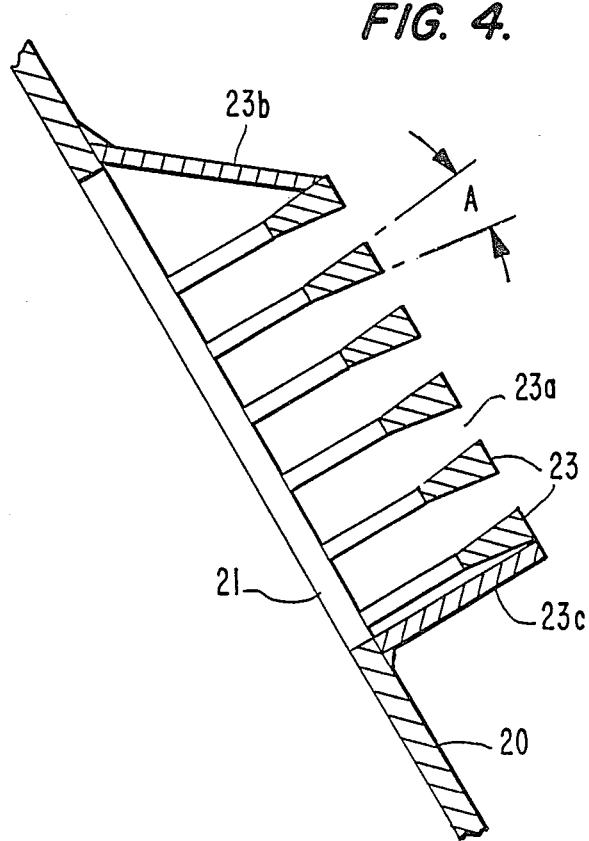
FIG. 4 shows a partial detail sectional view of the conical grid plate and screen configuration used for supporting and fluidizing the catalyst bed, taken along line 4—4' of FIG. 2.

As shown in FIG. 3, the conical grid 20 contains at least three and preferably 4–8 radially oriented elongated openings 21, each opening being covered by a parallel slotted screen material 23 formed in an elongated convex shape and rigidly attached to the upper sides of the radial openings 21 in the conical grid plate 20 such as by welding. Upper and lower ends of the convex screen 23 are sealed by solid plates 23b and 23c respectively, attached to grid plate 20. For the slotted type screen material, the multiple parallel bars defining the slots 23a are made tapered in cross-section, so that the opening width is greater at its lower side than at its upper side, as is further shown in FIG. 4. The included angle A for the sides of the tapered bars may vary between about 10° and 45°. Also as shown by FIG. 2, drain holes 21a are preferably provided in the grid 20 at the lowermost end of each section of the convex-shape parallel slotted Johnson screen 23 adjacent plate 23c, to drain any attrited particles of the catalyst 22 from the conical grid 20. Thus, any catalyst fines passing through openings in the conical grid screens 23 do not plug the slotted openings, and are drained from the bottom sub-assembly 14 of the vessel at connection 14b.

The vessel conical grid unit 20 permits withdrawing all rejuvenated catalyst from bed 22 through central withdrawal conduit 24 and bottom opening 12, before the next batch of used catalyst is introduced into the vessel at upper opening 11 for treatment and rejuvenation therein. The vessel lower withdrawal conduit 24 is provided with a telescopic type slip joint 25 which allows removal of the conical grid unit 20 from the conduit lower portion 24b of bottom head sub-assembly 14. A porous screen gasket 18 is provided between flanges 14a and 19a to ensure complete drainage of liquid from the annular space 28 between the grid skirt 19 and vessel wall 14c. Also, at least one drain opening 26 is provided in conduit 24 adjacent the lower head of subassembly 14 and covered by a screen 27 to provide for drainage of all catalyst-free liquids from the vessel through opening 12. Thus, the location of these drains provides for complete drainage of all liquids including hydrocarbon liquid solvent, acid and water from the vessel 10. A cylindrical baffle or skirt 29 is provided within the lower head sub-assembly 14 and supported from flange 14a to provide for uniform upward flow of fluid from side connection 15 upwardly through the grid unit 20 and catalyst bed 22.

Figure 5:
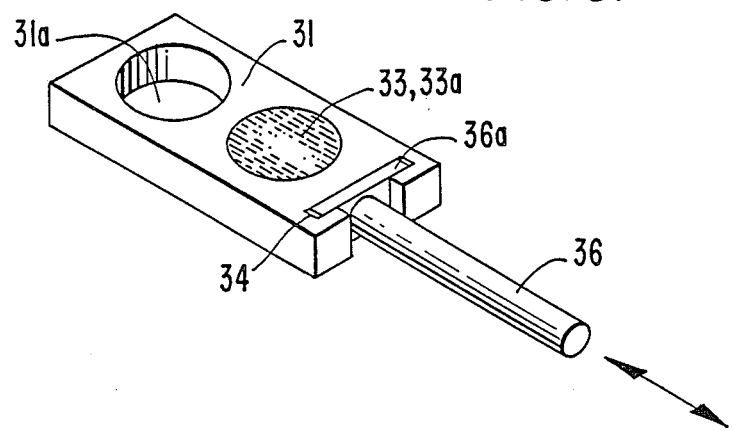
FIG. 5 shows a detail perspective view of the slide valve gate provided in the catalyst withdrawal conduit in the vessel lower portion sub-assembly.

A slide valve assembly 30 is provided attached to the upper portion 24a of the catalyst withdrawal conduit 24 to control the withdrawal of rejuvenated catalyst from bed 22 of the vessel 10. As seen in FIG. 2, the valve assembly includes a gate 31 slidable in a body member 32, which is rigidly attached to the withdrawal conduit upper portion 24a. The gate 31 contains a plain unrestricted opening 31a and screened opening 33 provided adjacent each other in the gate, as is shown by FIG. 5. The screened opening 33 serves to retain the catalyst in the bed 22 above the valve gate 31 and also permits catalyst particle fluidization in the bottom portion 22a of the bed within conduit 24a, so as to provide for rejuvenating all the catalyst within this lower portion of the vessel 10. The screened opening 33 preferably contains a parallel slotted Johnson type screen material firmly attached to the gate 31 and having multiple parallel openings 33a therein which expand outwardly in the downward direction. The width of slotted openings 33a at their upper side is selected to be slightly narrower than the catalyst particle effective diameter, so as to prevent the catalyst material except for a minor portion of fine particles from falling through the openings 33a.

The slide valve gate 31 is provided at one end with a transverse slot 34, which is shaped to receive a mating enlarged end portion 36a of a valve stem 36, so as to provide a removable slip fit connection between the valve gate 31 and stem 36. This arrangement permits removal of the valve gate from the lower head sub-assembly 14 of the vessel, while retaining stem 36 in place in the vessel to allow for differential vertical movement between the valve gate 31 and the vessel 10.

A packing gland 37 is provided for pressure sealing between the stem 36 and extension member 14d. An actuator means 38 such as a pneumatic piston is attached to the valve stem 36 outer end for opening and closing the valve gate 31. Whenever it is desired to withdraw catalyst from the vessel bed 22, valve gate 31 is moved by actuator means 38 so as to align the plain unrestricted opening 31a with withdrawal conduit 24.

The rejuvenation vessel 10 side wall is provided in its upper portion with two diametrically-opposed sight glass units 40, which are pressure-tightly attached to the vessel wall such as by bolted flanges 41, as shown in FIG. 1. The sight glass units have their inner faces 42 curved so as to be substantially flush with the inner cylindrical wall surface of the vessel 10. The sight glasses provide a means for viewing the catalyst level 22a in bed 22 to determine its state of fluidization during catalyst rejuvenation operations in the vessel.

Figure 6:
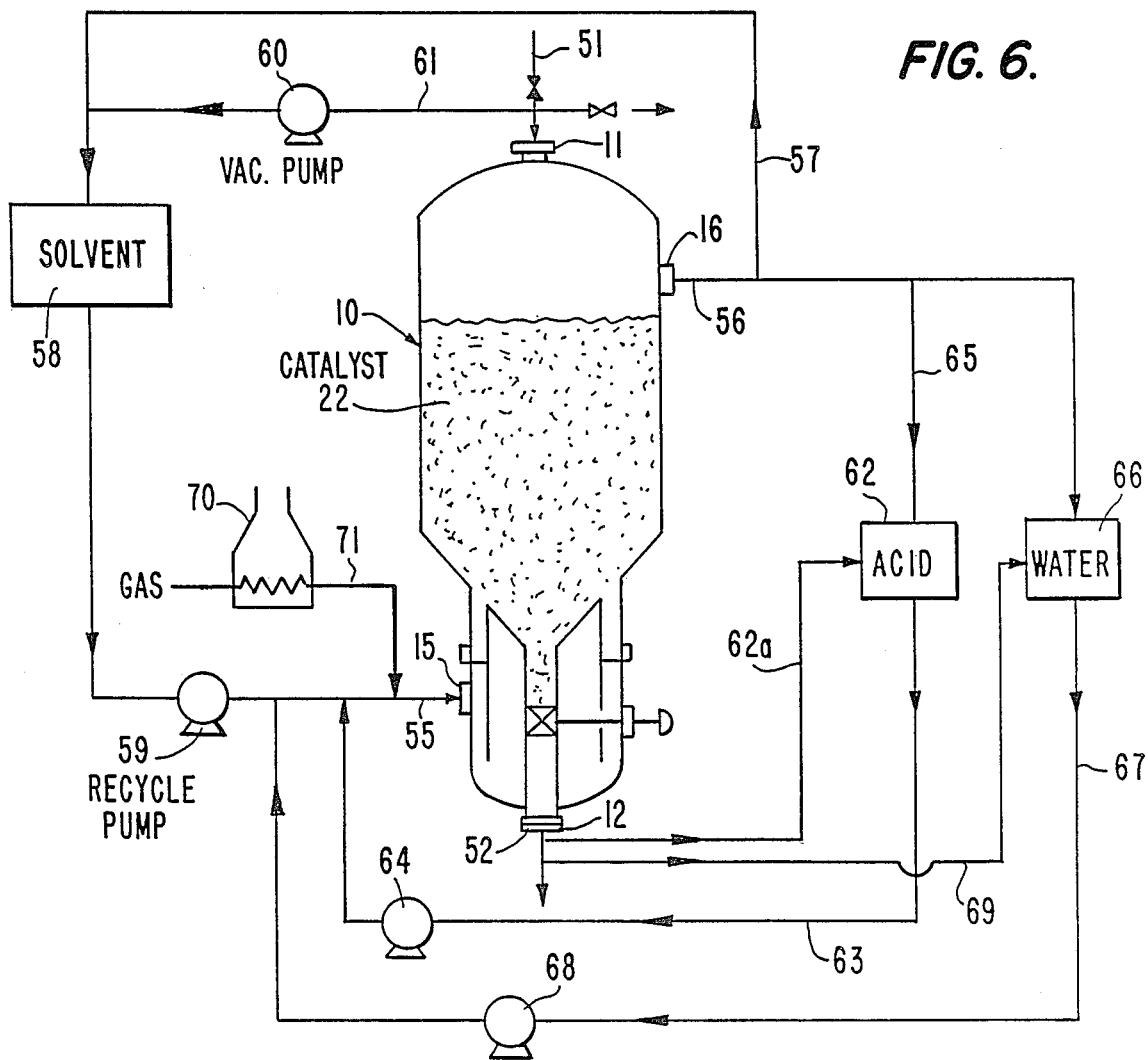
FIG. 6 is a schematic flow diagram showing a method for catalyst rejuvenation using the single vessel assembly of the present invention.

During catalyst rejuvenation operations, as shown by the FIG. 6 flow diagram, a quantity of particulate used catalyst containing a heavy hydrocarbon oil contaminant coating is introduced into the vessel 10 through upper opening 11 from conduit 51. A hydrocarbon solvent liquid such as naphtha or toluene is introduced into the vessel at its lower connection 15 from conduit 55 and pump 59, and the liquid upward flow is evenly distributed by cylindrical-shaped baffle 29 supported from flange 14a and extending completely around the vessel lower end portion. From the vessel lower end, the liquid solvent flows generally upwardly through the radial openings 21 and hence through the slotted opening 23a in the curved screens 23 in the conical grid 20, for uniform flow distribution upwardly through the catalyst bed 22. A liquid superficial upward velocity of 0.1-1.0 ft/sec. is provided in the catalyst bed 22 to gently fluidize the catalyst and provide efficient contacting of the catalyst with the solvent liquid, which is removed through upper connection 16 and conduit 56. The solvent liquid is recirculated through conduit 57 to storage tank 58 and to recycle pump 59. During solvent washing of the catalyst, a pressure of 5-10 psig is usually maintained in the vessel 10 to minimize vaporization of the liquid solvent therein.

Following solvent washing of the hydrocarbon coating from the catalyst in bed 22, any solvent remaining on the catalyst is evaporated and removed from the catalyst using vacuum drying or hot gas drying depending upon the solvent used. For vacuum drying, the vessel 10 and catalyst are evacuated at connection 11 by vacuum pump 60 and conduit 61 to a pressure of 1-10 psia for a period of 1-5 hours. The resulting substantially oil-free catalyst is then acid treated with a dilute acid solution such as 10-20 W % sulfuric acid in water for 1-4 hours to dissolve and remove deposited metal compounds from the catalyst. The acid solution from source 62 is introduced through conduit 63 and pump 64 into the vessel 10 at the lower connection 15, and is withdrawn at upper connection 16 and conduits 56 and 65. Residual acid remaining in the vessel after circulation is stopped is withdrawn from lower connection 12 thorugh conduit 62a. Before the acid treatment step, the oil-free catalyst in vessel 10 is preferably water washed to fill the catalyst pores with water, so that the acid treatment solution does not enter the small pores but is substantially confined to the external surface and large pores of the catalyst.

Following the acid treatment step, the catalyst is water washed to neutralize and/or remove the acid solution from the catalyst. Water flow from source 66 is introduced through conduit 67 and pump 68 to the lower inlet connection 15 and flows upwardly through the catalyst bed 22 to gently fluidize the catalyst. A major portion of the water flow exits through the upper overflow connection 16 to source 66, while the water remaining in vessel 10 is drained out through the bottom outlet opening 12 and through conduit 69. After the catalyst washing step is complete, the catalyst bed fluidization is stopped, and all residual water is drained out through opening 12. The washed catalyst is then dried by introducing a gas such as air or nitrogen heated by heater 70 and entering through conduit 71 at connection 15 and flowing the gas upwardly through the bed 22 to complete the rejuvenation of the catalyst. Following such rejuvenation of the catalyst, it is removed from the vessel 10 by opening the gate valve 30 in the withdrawal conduit 24 and withdrawing the catalyst out through opening 12.

This invention will be further described by the following examples of a typical catalyst rejuvenation vessel and method of operation, which examples should not be construed as limiting the scope of the invention.

EXAMPLE 1

A multi-function catalyst rejuvenation vessel assembly is constructed having the following characteristics:

| | |
|---|---|
| Catalyst bed weight, pounds | 2000 |
| Catalyst bed volume, ft$^3$ | approx. 30 |
| Catalyst normal particle size, in. dia. | 0.032 extrudates |
| Vessel outside diameter, ft. | 3 |
| Vessel overall height, ft. | 20 |
| Grid screen opening width, in. | 0.030 |
| Withdrawal conduit diameter, in. | 4 |

The vessel is constructed of steel alloy suitable for temperatures up to 350° F. and 0-120 psia pressure, and is internally lined with 0.25 inch thick corrosion resistant lining such as "Hastelloy" chromium-nickel alloy material to provide good resistance to acid corrosion.

EXAMPLE 2

Used catalyst removed from a petroleum hydroprocessing reactor has heavy hydrocarbon process oil with metal and carbon contaminents thereon, and has characteristics shown below in Table 1.

TABLE 1

| Typical Characteristics Of Used Oil-Coated Catalyst | |
|---|---|
| Catalyst particle size, in. | 0.030-0.125 dia. extrudates |
| Catalyst oil content, W % | 10-40 |
| Total metal contamanents, W % | 4-10 |

The used catalyst having a heavy oil coating and also oil contained within the catalyst pores is introduced into the upper end of a catalyst rejuvenation vessel constructed according to this invention to provide a catalyst bed therein. The catalyst is solvent washed by flowing toluene solvent upwardly through the catalyst at superficial velocity of up to about 0.4 ft/sec for 4 hours to gently fluidize the catalyst and to dissolve substantially all the heavy oil content from the catalyst. Next, the catalyst bed is evacuated to 1-5 psia pressure to evaporate substantially all the solvent from the catalyst, thereby leaving an essentially oil-free catalyst having the following typical analysis:

|  | Wt. % |
|---|---|
| Carbon | 16.3 |
| Sulfur | 13.6 |
| Nickel | 1.3 |
| Vanadium | 6.0 |
| Catalyst & Support | 62.8 |

The resulting oil-free catalyst is treated with 15 W % sulfuric acid solution by flowing the acid solution upwardly through the catalyst bed at up to about 0.4 ft/sec superficial velocity to gently fluidize and uniformly contact the catalyst particles for 1 hour, thereby converting the metal deposits on the catalyst into a soluble form. The presence of the carbon deposits on the catalyst serves to minimize or prevent acid attack on the catalyst activating metals and the substrate material.

Following acid treatment, the catalyst is water washed to displace and/or neutralize the acid solution by using about 4 pounds water per pound of catalyst. The water is drained from the catalyst bed, which is then dried by flowing warm air at 250° F. upwardly through the catalyst. Following the drying step, the rejuvenated catalyst is withdrawn from the vessel for further use and/or treatment.

Although this invention has been described broadly and in terms of specific embodiments thereof, it will be understood that modifications and variations can be made to the vessel and its method for use for catalyst rejuvenation within the scope of the invention, which is defined by the following claims.

We claim:

1. A method for rejuvenating used catalyst material removed from hydrocarbon processing operations in a single vessel assembly, comprising:
   (a) introducing a particulate used catalyst material containing heavy hydrocarbon oils coating and metals compound deposits into a vessel assembly, and providing a bed of said used catalyst above a conical grid within said vessel assembly said grid containing screen elements having multiple openings each shaped with a downwardly expanding taper for catalyst support and upward passage of fluids therethrough to fluidize and wash said particulate catalyst;
   (b) flowing a hydrocarbon solvent liquid upwardly through the catalyst bed at a velocity sufficient to fluidize the catalyst particles and substantially remove the heavy hydrocarbon oil coating from the catalyst particles;
   (c) draining and removing the solvent liquid from the catalyst bed to provide an essentially oil-free catalyst material in the bed;
   (d) flowing a dilute acid solution upwardly through the bed of oil-free catalyst in said vessel assembly to fluidize the catalyst and to dissolve and remove the metallic compound deposits from the catalyst in the bed;
   (e) water washing the acid-treated catalyst to remove the acid therefrom;
   (f) flowing a heated gas upwardly through said catalyst bed in said vessel assembly to dry the catalyst; and
   (g) withdrawing the dry rejuvenated catalyst from the vessel assembly.

2. A catalyst rejuvenation method according to claim 1, wherein the solvent liquid is toluene which is removed from the catalyst bed by evaporation at vacuum pressure.

3. A catalyst rejuvenation method according to claim 1, wherein the solvent liquid is evaporated from the catalyst at step (c) by maintaining conditions of 50°-350° F. temperature and 0.1-10 psia pressure for 1-5 hours.

4. A catalyst rejuvenation method according to claim 1, wherein the dilute acid solution is 10-20 W % sulfuric acid solution.

5. A catalyst rejuvenation method according to claim 1, wherein the rejuvenated catalyst is withdrawn from the bed above the conical grid and downwardly through a central withdrawal conduit and conduit valve located in the vessel lower portion.

6. A method for rejuvenating particulate used catalyst removed from a hydrocarbon processing operation in a single vessel assembly, comprising the steps of:
   (a) introducing a particulate used catalyst material containing heavy contaminent hydrocarbon oil coating and metals compound deposits into a rejuvenation vessel assembly, and providing a bed of said catalyst above a conical grid plate within said vessel assembly;
   (b) flowing toluene liquid solvent upwardly through the catalyst bed at velocity of 0.1-1 ft/sec to fluidize the catalyst particles and substantially remove the heavy hydrocarbon oils coating contained on the catalyst particles;
   (c) draining and evaporating the liquid solvent from the catalyst bed to provide an essentially oil-free catalyst material in the bed;
   (d) flowing a 10-20 W % sulfuric acid solution upwardly through the bed of oil-free catalyst in said vessel assembly to fluidize the catalyst and to dissolve and remove the metallic compound deposits from the catalyst in the bed;
   (e) water washing the acid-treated catalyst to remove the acid therefrom;
   (f) flowing heated gas upwardly through said catalyst bed in said vessel assembly to dry the catalyst; and
   (g) withdrawing the dry rejuvenated catalyst from above the conical grid and through a withdrawal conduit and control valve located in the vessel assembly lower portion.

* * * * *